United States Patent
Bargende

(10) Patent No.: US 6,882,418 B1
(45) Date of Patent: Apr. 19, 2005

(54) DEVICE FOR MONITORING THE COMBUSTION PROCESSES OCCURRING IN THE COMBUSTION CHAMBER OF AN INTERNAL COMBUSTION ENGINE

(75) Inventor: Michael Bargende, Stuttgart (DE)

(73) Assignee: FKFS Forschungsinstitut fur Kraftfahrwesen und Fahrzeugmotoren (DE)

( * ) Notice: Subject to any disclaimer, the term of this patent is extended or adjusted under 35 U.S.C. 154(b) by 408 days.

(21) Appl. No.: 10/204,607
(22) PCT Filed: Sep. 14, 2000
(86) PCT No.: PCT/EP00/09003
§ 371 (c)(1), (2), (4) Date: Aug. 21, 2002
(87) PCT Pub. No.: WO01/40753
PCT Pub. Date: Jun. 7, 2001

(51) Int. Cl.$^7$ .................. G01N 21/00; G01M 15/00; F02P 5/00
(52) U.S. Cl. .............. 356/241.1; 73/116; 73/117.3; 73/119 A; 123/406.28
(58) Field of Search .............. 356/43, 241.1, 356/44, 337, 338, 341, 213, 218, 219, 432, 433, 434; 123/305, 406.23, 406.24, 406.28, 406.29; 385/12; 73/116, 117.1, 117.2, 117.3, 119 R, 119 A

(56) References Cited

U.S. PATENT DOCUMENTS

| | | | |
|---|---|---|---|
| 3,703,825 A | * 11/1972 | Merlo | 73/116 |
| 3,978,720 A | * 9/1976 | Ford | 73/116 |
| 4,393,687 A | * 7/1983 | Muller et al. | 73/35.07 |
| 4,444,169 A | * 4/1984 | Kirisawa et al. | 73/116 |
| 4,463,729 A | * 8/1984 | Bullis et al. | 73/117.3 |
| 4,562,821 A | * 1/1986 | Ikeda | 123/305 |

FOREIGN PATENT DOCUMENTS

| | | |
|---|---|---|
| DE | 19710654 | 9/1998 |
| DE | 19823594 | 12/1998 |
| DE | 19830213 | 1/1999 |
| EP | 0379870 | 3/1986 |
| EP | 0385321 | 9/1990 |

Primary Examiner—Zandra V. Smith
Assistant Examiner—Juan D Valentin, II
(74) Attorney, Agent, or Firm—Ostrolenk, Faber, Gerb & Soffen, LLP

(57) ABSTRACT

The invention relates to a device for monitoring the combustion processes occurring in the combustion chamber of an internal combustion engine, which comprises a housing (1), which may be built into the wall of the combustion chamber, with a measuring sect-on which extends to the combustion chamber and with a number of drillings (3), which extend along the longitudinal axis of the housing, in each of which an optical guide (2) is arranged. A first end of an optical guide, lying at the first end of the drilling, receives light from inside the combustion chamber and a second end of said optical guide is linked to an opto-electronic analyzer. The drillings have an end section (3A), adjacent to the combustion chamber, which extend out of the housing, through an outer surface of the measuring section, at an angle ($\alpha$) to the longitudinal axis of the housing. The first end of the optical guide comprises a light-admitting opening directed at the inner end of the end section and a mirrored surface, lying opposite said opening, which reflects light in the direction of the longitudinal axis of the optical guide.

10 Claims, 4 Drawing Sheets

U.S. PATENT DOCUMENTS

| | | | | |
|---|---|---|---|---|
| 4,633,842 A | * | 1/1987 | Ikeda et al. | 123/501 |
| 4,665,740 A | * | 5/1987 | Matsumoto et al. | 73/116 |
| 4,774,834 A | * | 10/1988 | Russell et al. | 73/119 A |
| 4,779,455 A | * | 10/1988 | Kuroiwa et al. | 73/116 |
| 4,825,689 A | * | 5/1989 | Haworth et al. | 73/116 |
| 4,919,099 A | * | 4/1990 | Extance et al. | 123/406.28 |
| 5,103,789 A | * | 4/1992 | Hartman et al. | 73/116 |
| 5,219,227 A | * | 6/1993 | Yang et al. | 374/143 |
| 5,283,852 A | * | 2/1994 | Gibler et al. | 385/136 |
| 5,384,467 A | * | 1/1995 | Plimon et al. | 250/227.2 |
| 5,390,546 A | * | 2/1995 | Wlodarczyk | 73/116 |
| 5,400,648 A | | 3/1995 | Mahr | 73/115 |
| 5,421,195 A | * | 6/1995 | Wlodarczyk | 250/227.16 |
| 5,421,652 A | * | 6/1995 | Kast et al. | 356/44 |
| 5,659,133 A | * | 8/1997 | Sims et al. | 356/43 |
| 5,762,045 A | * | 6/1998 | Pockstaller et al. | 123/406.28 |
| 5,763,888 A | * | 6/1998 | Glasheen et al. | 250/372 |
| 5,922,948 A | | 7/1999 | Lesko et al. | 73/117.3 |
| 5,961,314 A | * | 10/1999 | Myhre et al. | 250/214 A |
| 6,622,549 B1 | * | 9/2003 | Wlodarczyk et al. | 73/119 A |
| 6,642,718 B1 | * | 11/2003 | Brushwood | 324/393 |
| 6,668,630 B1 | * | 12/2003 | Kuglin et al. | 73/117.3 |

* cited by examiner

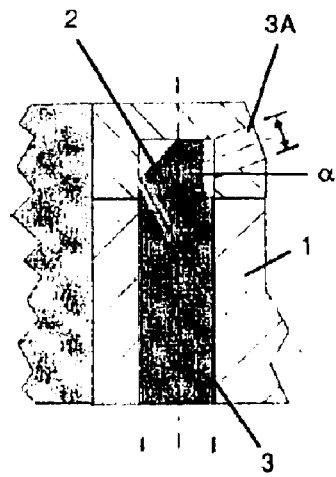
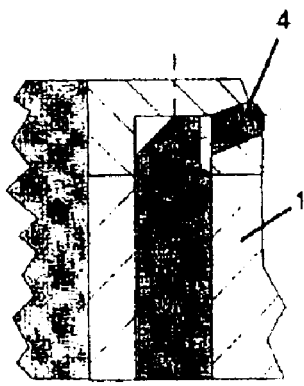
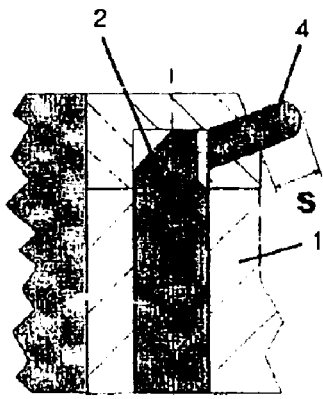
Fig. 3A  Fig. 3B  Fig. 3C
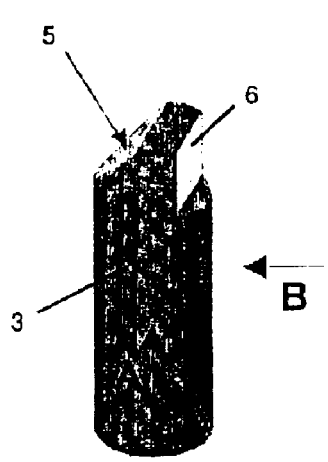
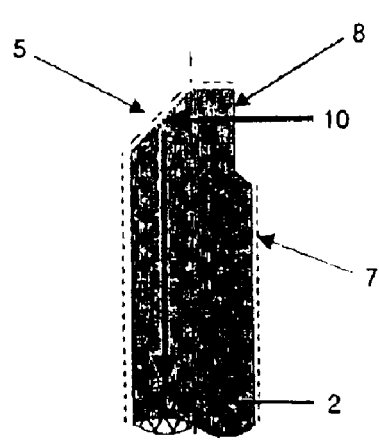
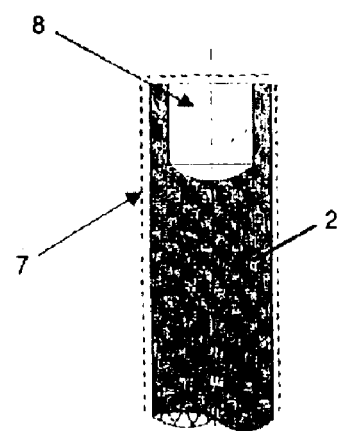
Fig. 4A  Fig. 4B  Fig. 4C

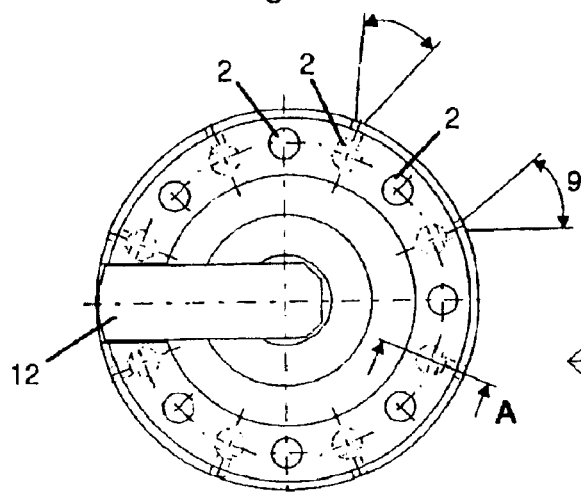
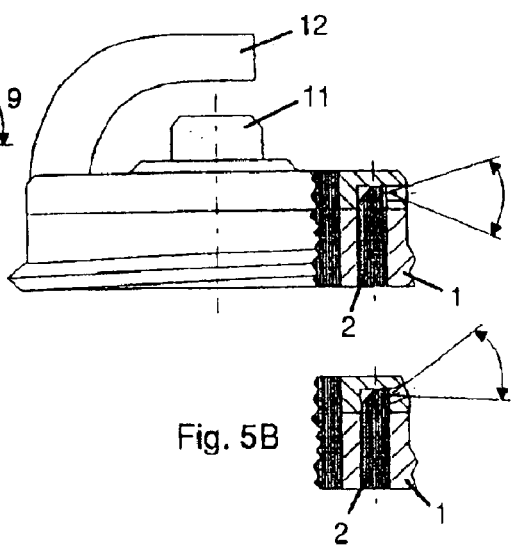
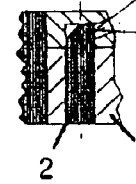
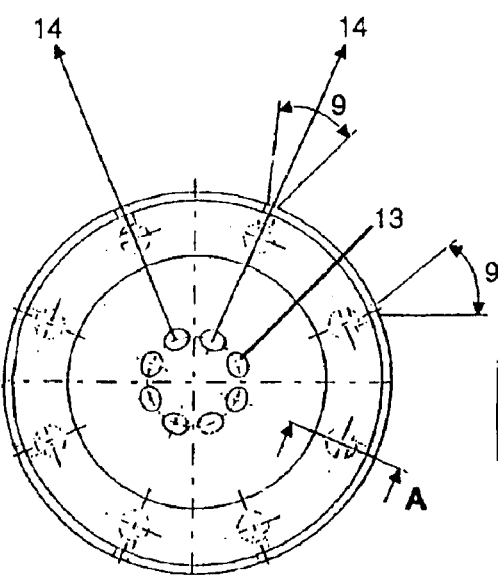
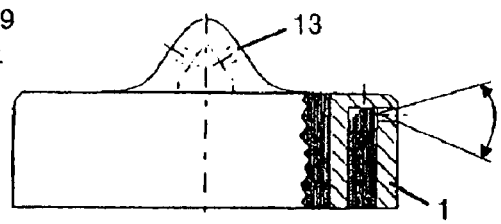
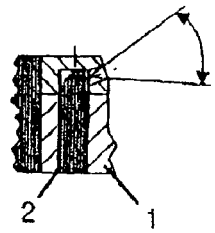

DEVICE FOR MONITORING THE COMBUSTION PROCESSES OCCURRING IN THE COMBUSTION CHAMBER OF AN INTERNAL COMBUSTION ENGINE

BACKGROUND OF THE INVENTION

The invention relates to a device for monitoring the combustion processes occurring in the combustion chamber of an internal combustion engine.

The development of internal combustion engines —both spark ignition and diesel engines —requires the widest possible knowledge of the processes occurring during combustion in order to reduce further both the fuel consumption and the emissions of exhaust gases and noise.

In order to be able to observe and analyze the combustion process —and phenomena associated with it—various optical measuring methods and measuring devices have been developed in the last few years. In the predevelopment and series development of internal combustion engines, it is, however, possible —in contrast to the basic research —to apply only methods and devices in which the necessary optical accesses to the combustion chamber are configured in such a way that the shape of the combustion chamber and, for example the thermal state of the combustion chamber walls, remain largely unchanged.

With these known methods and devices, the light that is emitted by the flame in the combustion space is extracted from the combustion space by means of lightguides and fed to a light/voltage transducer (photomultiplier, photodiode or CCD array). The electrical voltage present in these transducers is proportional to the intensity of the light and can be converted by means of A/D converters into digital data which can be electronically processed. Therefore, these methods and devices do not require any electrical auxiliary voltages or supply voltages or injection of extraneous light (for example by means of laser light).

DE-A1 198 30 213 discloses a device for monitoring the combustion processes occurring in the combustion chamber of an internal combustion engine, in the for, of a spark plug for internal combustion engines, in which spark plug a group of lightguides is installed at the circumference of the housing of the spark plug in order to be able to analyze the flash phase after the actual ignition and the early propagation phase of the flame. With this device, it is possible to see into only part of the combustion chamber, and observation oz the propagation of the flame with local resolution in the combustion chambers of engines is possible, even then only to a restricted degree, if a plurality of collection drilled holes provided in the spark plug are connected to one another by an each case a few lightguides of the group.

The same also applies to a device disclosed in DE-A1-198 23 594 in which a lightguide is provided which is integrated into a cylinder head seal and brings about a connection between the combustion chamber and an evaluation unit. The lightguide opens here into the combustion chamber via a translucent sealing element.

SUMMARY OF THE INVENTION

The invention is based on the object of providing a device of the type mentioned at the beginning which permits the combustion processes to be observed with local resolution, without influencing the thermal or mechanical state of the combustion chamber and with a simple design.

This object is achieved by the invention.

Further refinements and developments of the invention emerge from the subclaims.

The refinement of the device according to the invention permits the propagation of the flame in the combustion chambers of engines to be observed with local resolution with a simple design and without influencing the thermal or mechanical state of the combustion chamber. The device according to the invention can be used both in spark ignition and diesel engines.

BRIEF DESCRIPTION OF THE DRAWINGS

Exemplary embodiments of the invention are also explained in more detail below with reference to the drawings, in which:

FIG. 3A shows a partial view of the housing according to FIG. 2 which shows the arrangement of the lightguide and of the light entry opening, FIG. 3B shows a view corresponding to FIG. 3A of a modified embodiment, FIG. 3C shows a view of a further embodiment corresponding to FIG. 3A, FIG. 4A shows a perspective view of the combustion chamber end of an embodiment of the lightguide, FIG. 4B shows a side view of the lightguide according to FIG. 4A, FIG. 4C shows a front view of the lightguide according to FIG. 4A, FIG. 5 shows a plan view of the end of an embodiment of the device in the form of a spark plug, FIG. 5A shows a broken, partially sectional view of the embodiment according to FIG. 5, FIG. 5B shows a view of a modified embodiment corresponding to a part of FIG. 5A, FIG. 6 shows a plan view of the end of an embodiment of the device in the form of an injection nozzle, FIG. 6A shows a broken, partially sectional view of the embodiment according to FIG. 6, FIG. 6B shows a view of a modified embodiment corresponding to part of FIG. 6A.

DESCRIPTION OF PREFERRED EMBODIMENTS

Figure 1:
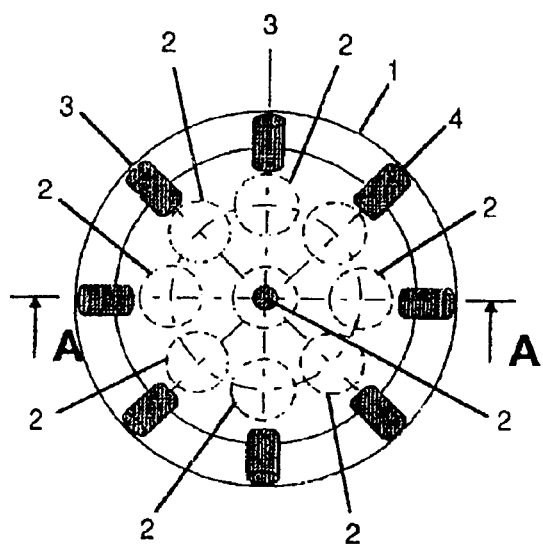
FIG. 1 shows a plan view of the end of the measuring section of an embodiment.
Figure 2:
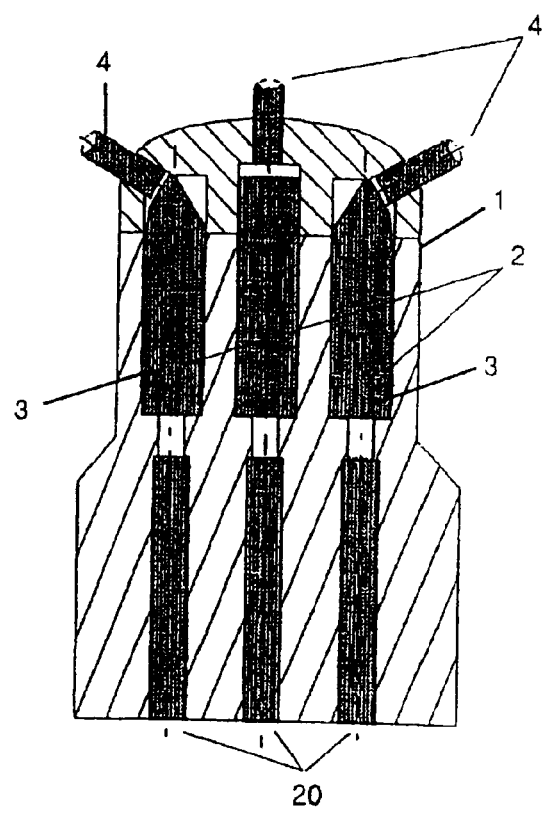
FIG. 2 shows a section view along the line A according to FIG. 1.

The embodiment of the device illustrated schematically in FIGS. 1 and 2 has a, for example, cylindrical housing or a holder 1 in which a number of drilled holes, for example nine drilled holes 3 are formed, in each of which drilled holes 3 a lightguide 2 is arranged whose longitudinal axis runs parallel to the longitudinal axis of the housing 1.

Instead of a central lightguide 2 which is surrounded in a ring shape by the other lightguides, a pressure sensor may also be installed (not illustrated) in order to permit simultaneous measurement of the light emission which is broken up into sectors and of the combustion space pressure. As is explained in more detail below, the ring of lightguides can also surround the center electrode of a spark plug or an injection nozzle arrangement.

The cylindrical housing 1 typically has a diameter of 10–12 mm and can be installed by means of a thread in a drilled hole provided for this purpose in a cylinder head, the upper end in FIG. 2 forming a measuring section which extends into the combustion chamber. In diesel engines in passenger cars, the glow plug drilled hole, for example, may be suitable as the drilled hole.

The drilled holes 3 in the housing 1 each have a combustion-space-end section 3A which extends at an angle with respect to the longitudinal axis of the housing 1 and thus of the lightguide through an outer face of the measuring section into the combustion space (not illustrated).

The combustion light can be injected into the lightguides 2 through the end sections 3A of the drilled holes, as is shown in FIG. 3A.

As is shown in FIGS. 3B and 3C, further lightguides, advantageously in the form of small quartz glass rods 4, which prevent contamination of the end section 3A of the drilled holes 3 and whose combustion-space-end surface can easily be cleaned can be inserted into these end sections 3A of the drilled holes 3. The combustion-space-end surface of these small quartz glass rods 4 can be ground concavely or convexly as a lens in order to adjust the viewing angle 9 (FIGS. 5 and 6) appropriately to the requirements.

In FIG. 3B, these small quartz glass rods 4 terminate essentially with the outer surface of the measuring section. However, according to FIG. 3C, they can also be embodied with a protruding part which is dimensioned such that at all operating points of the combustion engine the lens reaches a temperature at which contamination is reliably prevented by "burring off". This can also be promoted by the fact that the lens is coated with a catalytically active layer (for example platinum), which is only several nm (nanometers) thick and thus translucent, said layer ensuring that the necessary "burning-off temperature" at the surface of the lens is reduced. If the small quartz glass rods 4 are installed with a protruding part, nontranslucent coating of the cylindrical part of the small rods is to be provided in order to prevent a lateral instance of light.

The combustion light which is instant via the end sections 3A of the drilled holes 3 and the small quartz glass rods 4 which are arranged therein is injected into the lightguides 2 which are mounted in the drilled holes 3 and which also inject quartz glass rods with a diameter which is preferably greater than the diameter of the end sections 3A or of the quartz glass rods 4.

These quartz glass rods 2 are, according to FIGS. 4B and 4C, in turn provided in their cylindrical part with a non-translucent coating 7. In order to inject the light, a window 6 which is parallel to the longitudinal axis of the quartz glass rod 2 is ground in, and an oblique face 5, which is mirror-coated on the rear in order to deflect the light is ground on (B). The angle of the mirrored face is dimensioned so as to correspond with the angle α (FIG. 3A) of the end section 3A.

The angle of the oblique face 5 and of the lens grinding of the small quartz glass rods 4 are configured in such a way that the entire combustion chamber can be seen into as uniformly as possible with all the lightguides 2, 4 installed in the housing 1.

Figure 7:
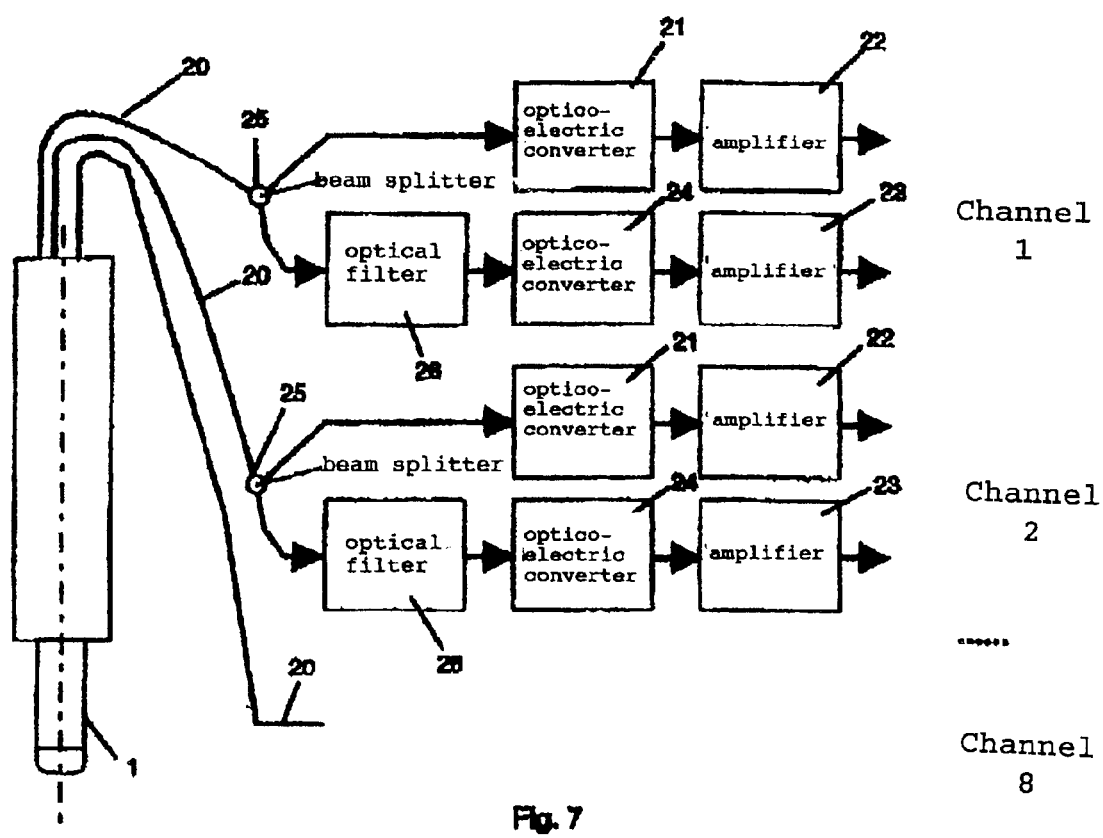
FIG. 7 shows an embodiment of an evaluation unit for a device according to one of FIGS. 1 to 6.

The light which emerges from the quartz glass rods 2 is injected into flexible lightguides 20 in the housing 1 (see FIG. 2), and is thus guided out of the combustion space for further processing in an evaluation unit shown in FIG. 7.

In the embodiment of the evaluation unit shown in FIG. 7, in order to measure the entire light the combustion light is fed to corresponding light/voltage transducers 21 (photomultiplier or photodiodes) and converted there into an electrical voltage which is proportional to the intensity of the light. This electrical voltage is amplified in amplifiers 22 (D.C. amplifiers with a bandwidth of at least 100 kHz) and fed on a channel basis to a measuring data processing system (not illustrated) supported by electronic data processing.

The light signal is preferably divided into a plurality of branches by the lightguides 20 in an optical light splitter 25 so that wavelengths which are characteristic of the combustion processes (for example radiation of the OH:310 nm) can be measured by means of optical filters 26.

In the case of a spark ignition engine there is a particularly advantageous application if the housing 1 is formed by the outer casing of a spark plug, as is shown in FIGS. 5, 5A and 5B.

With corresponding miniaturization it is also possible to accommodate the lightguides which are known from the lightguide plug so that it is possible to observe the flash phase.

The angle α of the light entry drilled holes formed by the end sections 3A and the lens grinding of the small glass rods are configured in such a way that with the lightguides 2 and optionally 4 the entire combustion space is viewed and the viewing cones of the individual lightguides just touch the edge of the combustion space even when there is a spark plug located in the combustion space roof.

With this arrangement it is possible to analyze any irregularities of the propagation of the flame by evaluating sector-specific intensity differences in the light emission (all the light or of one or more discrete wavelengths). Furthermore, it becomes possible to detect the local occurrence of auto-ignition of the fresh mixture (referred to as "knocking").

In a diesel engine with direct injection, a particularly advantageous application is obtained if the housing 1 forms a part of an injection nozzle as is shown in FIGS. 6, 6A and 6B.

The end sections 3A of the drilled holes 3 and the quartz glass rods 4 arranged therein are positioned in such a way that they lie precisely in the direction of the injection jets 14 which emerge from the nozzle drilled holes 13 and are constructed in terms of their angle αin such a way that they "look" into the piston recess which is always present in direct-injecting diesel engines.

In this way, analyses of the uniformity of the injection jets with sector resolution and their flash process is possible when the engine is actually operating.

As is apparent from a comparison of the embodiments illustrated in FIGS. 5A and 6A or 5B and 6B, the angle α of the end sections 3A and its length, or the length of the lightguides 4, can be selected in such a way that a desired observation range is obtained.

In all the embodiments illustrated, the end sections 3A open into the circumferential region of the housing 1. However, it is also possible, depending on the desired observation region, for these end sections to open into the combustion-space-end face of the housing.

What is claimed is:

1. A device for monitoring the combustion processes occurring in the combustion chamber of an internal combustion engine, with a housing (1) which can be installed in a wall of the combustion chamber and which has a measuring section which, in the installed state, extends to the combustion chamber, the housing (1) having a number of drilled holes (3) which extend alone the longitudinal axis of the housing and in which respective lightguides (2) are arranged, and a first end, lying at a first end of the drilled hole (3), of a respective lightguide (2) receiving light from the interior of the combustion chamber and a second end of the respective lightguide being connected to opto-electronic evaluation devices, characterized in that the drilled holes (3) have, adjacent to the combustion chamber, an end section (3A) which extends out of the housing (1) at an angle ($\alpha$) with respect to the longitudinal axis of the housing (1) and through an outer face of the measuring section, and characterized in that the first end of the lightguide (2) has a light entry opening (6) which is directed onto the interior end of the end section (3A), and a mirrored face (5) which lies opposite said light entry opening (6) and reverses the instant light in the direction of the longitudinal axis of the light guide (2).

2. The device as claimed in claim 1, characterized in that further lightguides (4) which have a lens-shaped end which is directed to the combustion chamber and a further end which lies in the light entry opening (6) of the first lightguide (2) are arranged in the end sections (3A).

3. The device as claimed in claim 2, characterized in that the further lightguides (4) project over the outer face of the end section into the combustion space and are provided at their cylindrical circumferential face with a non-translucent coating.

4. The device as claimed in claim 2 or 3, characterized in that the section of the further lightguides (4) which is directed onto the combustion chamber or into it is coated with a translucent, catalytically active layer.

5. The device as claimed in one of the preceding claims, characterized in that the housing (1) is the outer casing of a spark plug, and in that the drilled holes (3) which extend in the longitudinal direction are arranged at the outer circumference of the housing in a concentric arrangement.

6. The device as claimed in one of the preceding claims, characterized in that the first ends of the lightguides (2) have a flattened portion of their outer surface which lies opposite the mirror surface (5) and which forms the light entry opening (6).

7. The device as claimed in one of the preceding claims, characterized in that the end sections (3A) end in a circumferential face of the housing (1).

8. The device as claimed in one of the preceding claims, characterized in that the end sections (3A) end in an end face of the housing (1).

9. The device as claimed in one of the preceding claims, characterized in that the first lightguide (2) and/or the further lightguide (4) is formed by a quartz glass rod whose outer circumference is provided with a non-translucent coating (7).

10. The device as claimed in one of the preceding claims, characterized in that the second ends of the first lightguide (2) are optically coupled to one end of flexible lightguides (20) which extend out of the housing (1) and are connected to the evaluation devices.

* * * * *